United States Patent
Whight

(10) Patent No.: US 7,082,156 B2
(45) Date of Patent: Jul. 25, 2006

(54) METHOD OF DETECTING, AND A RECEIVER FOR, A SPREAD SPECTRUM SIGNAL

(75) Inventor: Kenneth R. Whight, Horsham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 838 days.

(21) Appl. No.: 10/134,212

(22) Filed: Apr. 26, 2002

(65) Prior Publication Data

US 2002/0181564 A1 Dec. 5, 2002

(30) Foreign Application Priority Data

Apr. 28, 2001 (GB) .................................. 0110464.5

(51) Int. Cl.
H04B 1/69 (2006.01)
(52) U.S. Cl. ...................................... 375/149; 375/152
(58) Field of Classification Search ................ 375/130, 375/143, 142, 145, 147, 149, 150, 152, 316, 375/343; 370/441, 335, 342
See application file for complete search history.

(56) References Cited

U.S. PATENT DOCUMENTS 6,154,487 A * 11/2000 Murai et al. ................ 375/150
6,816,542 B1 * 11/2004 Komatsu .................... 375/148
2001/0014114 A1 * 8/2001 Baltersee et al. ........... 375/148
2001/0050950 A1 * 12/2001 Sato ........................... 375/150

FOREIGN PATENT DOCUMENTS

EP 1089452 A1 9/1999

OTHER PUBLICATIONS

W.W. Jones et al; "Post Acquisition PN Code Uncertainty Reduction by Least-Squeares Interpolation", Military Communications in a Changing World. Mclean, VA. Nov. 4-7, 1991, Proceedings of the Military Communications Conference. (MILCOM) New York, IEEE, US vol. 2, Nov. 4, 1991, pp. 804-808, XP010042260.

* cited by examiner

Primary Examiner—Tesfaldet Bocure

(57) ABSTRACT

A method of detecting, and a receiver for, a spread spectrum signal, in which a chip sequence is sampled (110) and filtered in a matched filter (120), the output of the filter is averaged (130) over respective samples of successive chip sequences, sub-samples are determined (180) by interpolating between the averaged samples, and the position of the chip sequence in the spread spectrum signal is determined (170) by determining the position of closest match between the sub-samples and samples taken at the same interval from a reference correlation function (160) of the chip sequence. The time of arrival of the spread spectrum signal may be determined by comparison of the position of the chip sequence, or an average of more than one such position, with a time reference. The position of closest match may be determined by correlation.

10 Claims, 4 Drawing Sheets

METHOD OF DETECTING, AND A RECEIVER FOR, A SPREAD SPECTRUM SIGNAL

FIELD OF THE INVENTION

The present invention relates to a method of detecting a spread spectrum signal and to a receiver for a spread spectrum signal, and has application in, for example, apparatus for estimating the time of arrival of a signal, apparatus for estimating the distance travelled by signal from a transmitter to a receiver, and in location determining apparatus.

BACKGROUND AND SUMMARY OF THE INVENTION

It is known to detect a spread spectrum chip sequence by correlating a received signal with a reference signal, the peak of the correlation function indicating detection of the sequence. Typically, the detection is performed using samples of the received signal and of the reference signal. Due to sampling, the maximum resolution for determining the position of the sequence in the received signal is ±0.5 sample interval. For example, a sequence transmitted at a chip rate of 2.2 Mchip.s1 and sampled in the receiver at 22 Msample.s$^{-1}$ would give a detection resolution of ±0.5/22 10$^{-6}$=±2.27 10$^{-8}$ seconds. If such a detection process is used for calculating the signal propagation time from the transmitter to the receiver, the accuracy of the propagation time calculation is ±2.27 10$^{-8}$ seconds. Furthermore, if such a calculated propagation time is used for calculating the distance travelled by the signal from the transmitter to the receiver, the accuracy of the distance calculation is ±c×2.27 10$^{-8}$, where c is the speed of light, approximately 3.10$^8$ m.s$^{-1}$. Therefore the resulting distance resolution is ±6.81 m.

A higher resolution can be achieved by increasing the sampling rate, but at the expense of increased power consumption and complexity A higher resolution can also be obtained by averaging over measurements made on several occurrences of the chip sequence in the received signal, but at the expense of increased power consumption and increased time delay. In some applications, for example in portable range determining apparatus and portable location determining apparatus for use in an indoor environment, it is desirable to have a rapid high detection resolution and a low power consumption.

An object of the present invention is to provide improvements in the detection of a spread spectrum chip sequence.

According to one aspect of the invention there is provided a method of detecting a spread spectrum signal comprising a chip sequence, comprising sampling at a sampling interval a received signal, filtering in a matched filter the samples thereby obtained, determining the absolute values of the filtered samples, deriving the weighted average values of the absolute values of the filtered samples occurring at intervals equal to the chip sequence length, the weighted average values being calculated over at least two such absolute values, interpolating successive weighted average values thereby generating sub-samples of the weighted average values at a sub-sampling interval shorter than the sampling interval, and determining the position of the chip sequence in the received signal by determining the position of closest match between the sub-samples and samples taken at the sub-sampling interval from a reference correlation function of the chip sequence.

According to another aspect of the invention there is provided a receiver for a spread spectrum signal comprising a chip sequence, comprising sampling means for sampling at a sampling interval a received signal, matched filtering means for filtering the samples thereby obtained, modulus means for determining the absolute values of the filtered samples, averaging means for calculating the weighted average values of the absolute values of the filtered samples occurring at intervals equal to the chip sequence length, the weighted average values being calculated over at least two such absolute values, interpolating means for interpolating successive weighted average values thereby generating sub-samples of the weighted average values at a sub-sampling interval shorter than the sampling interval, and matching means for determining the position of the chip sequence in the received signal by determining the position of closest match between the sub-samples and samples taken at the sub-sampling interval from a reference correlation function of the chip sequence.

By using the interpolated sub-samples at the sub-sampling interval for determining the position of closest match between the chip sequence in the received signal and the reference correlation function, a higher detection resolution may be obtained than using samples at the sampling interval. The higher resolution is obtained without requiring an analogue-to-digital sampling circuit to operated at the sub-sampling rate, thereby avoiding the higher power consumption and increased complexity of such a sampling circuit.

The position of closest match between the sub-samples and the samples of the reference correlation function of the chip sequence may be determined by correlating the sub-samples with the samples of the reference correlation function of the chip sequence.

The time of arrival of the spread spectrum signal may be determined as the determined position of the chip sequence in the received signal relative to a time reference.

The time of arrival of the spread spectrum signal may be determined as the average of more than one determined position of the chip sequence in the received signal relative to a time reference.

The time taken for a radio signal to propagate between the transmitter and receiver may be determined from the time of arrival if the transmitter and receiver have synchronised time references.

The distance between the transmitter and receiver may be determined from the time taken for a radio signal to propagate between the transmitter and receiver.

The interpolation and matching need not be performed over the duration of a complete chip sequence, but may be performed over a shorter duration in the region of a peak in the weighted average values of the absolute values of the filtered samples, thereby avoiding the higher power consumption and circuit complexity of interpolating and matching over the duration of a complete chip sequence.

In one embodiment of the invention the weighted average values of the absolute values of the filtered samples are calculated in accordance with the equation:

$$\hat{\chi}_i^n = \alpha \cdot \hat{\chi}_i^{n-1} + (1-\alpha) \cdot \chi_i^n$$

where $\chi_i^n$ is the absolute value of the i th filtered sample in the n th chip sequence, $\hat{\chi}_i^n$ is the weighted average value of the absolute value of the i th filtered sample in the n th chip sequence, $\hat{\chi}_i^{n-1}$ is the weighted average value of the absolute value of the i th filtered sample in the n−1 th chip sequence, and α is the averaging gain and has a value in the range $0 \leq \alpha \leq 1$.

BRIEF DESCRIPTION OF THE DRAWING

The invention will now be described, by way of example, with reference to the accompanying drawings, wherein:

FIG. 5 shows graphs of signals within a spread spectrum receiver.

In the drawings the same reference numerals have been used to represent corresponding features.

DETAILED DESCRIPTION OF THE INVENTION

Figure 1:
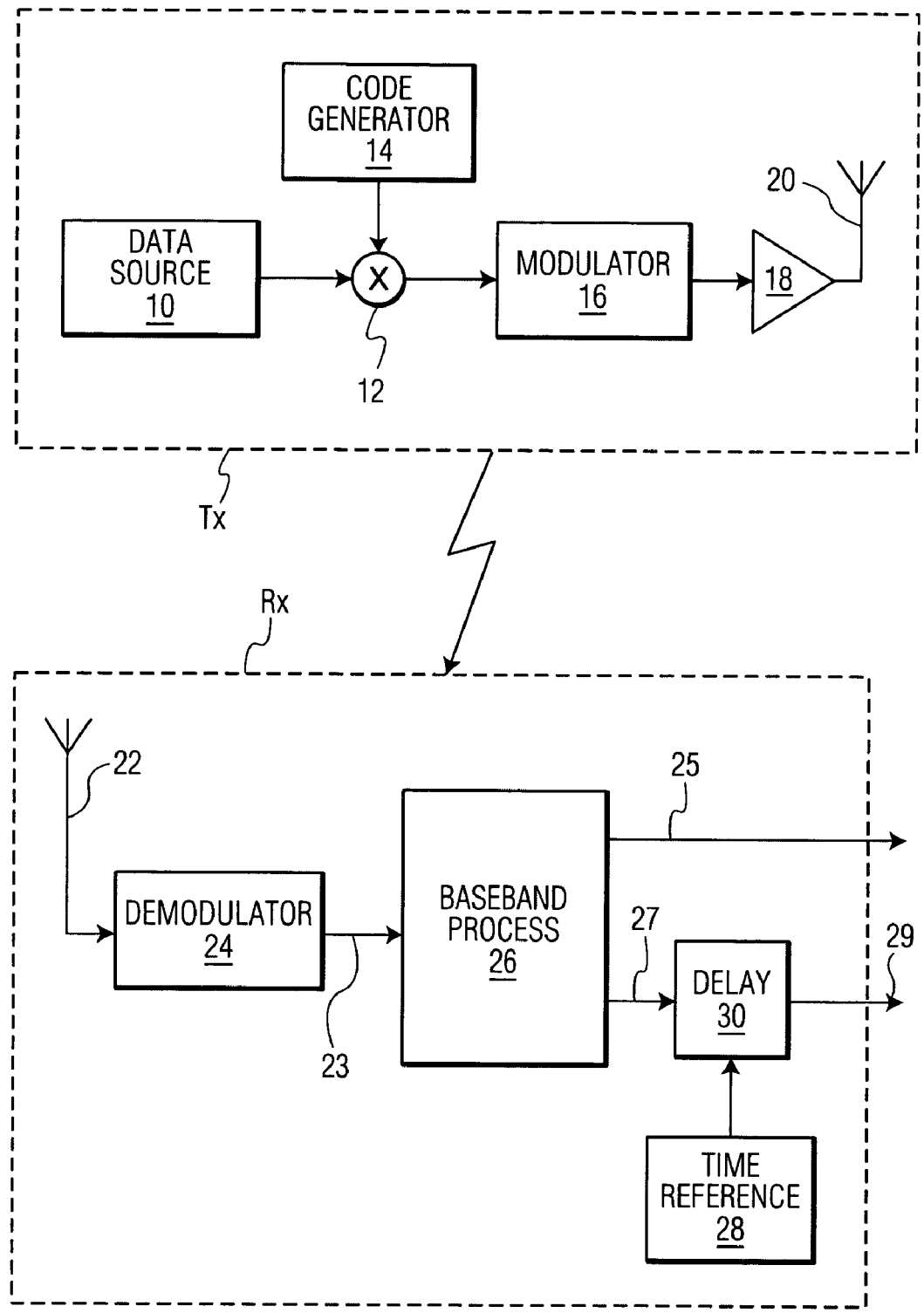
FIG. 1 is a block schematic diagram of an embodiment of a spread spectrum system.

Referring to FIG. 1, the spread spectrum system comprises a transmitter Tx and a receiver Rx. The system uses a C chip P-N (psuedo-noise) sequence for spreading. For convenience of description it will be assumed that the system operates in the 2.4 GHz ISM band with a bit rate of 200 kbit.s$^{-1}$, with the signal spread to 2.2 MHz using a sequence of 11 chips (C=11) at a chip rate of 2.2 Mchip.s$^{-1}$. The transmitter Tx comprises a data source 10 which produces symbols in the form of bits at 200 kbit.s$^{-1}$. The symbols are supplied to a mixer 12 to which is connected a code generator 14 which supplies an 11 chip P-N sequence. The 2.2 MHz spread signal is supplied by the mixer 12 to a GFSK modulator 16, the output of which is a modulated radio signal which is amplified in a power amplifier 18 and propagated by an antenna 20. In the course of being propagated the radio signal will be subject to noise and distortion.

At the receiver Rx, the propagated radio signal is received by an antenna 22 and is passed to an RF front end and demodulator 24. An output 23 of the RF front end and demodulator 24 is coupled to a baseband processing section 26 which is described in detail below. There are two outputs from the baseband processing section 26. The first output 25 supplies an indication of the value of a received symbol. The second output 27 supplies an indication of the position of the chip sequence in the received signal and is coupled to a first input of a delay determining means 30. The delay determining means 30 also receives a time reference signal from a time reference source 28. The delay determining means 30 determines the time difference between the time reference signal and the indication of the position of the chip sequence in the received signal. This time difference represents the time of arrival of the received signal relative to the time reference, and an indication of this time of arrival is supplied on an output 29.

Figure 2:
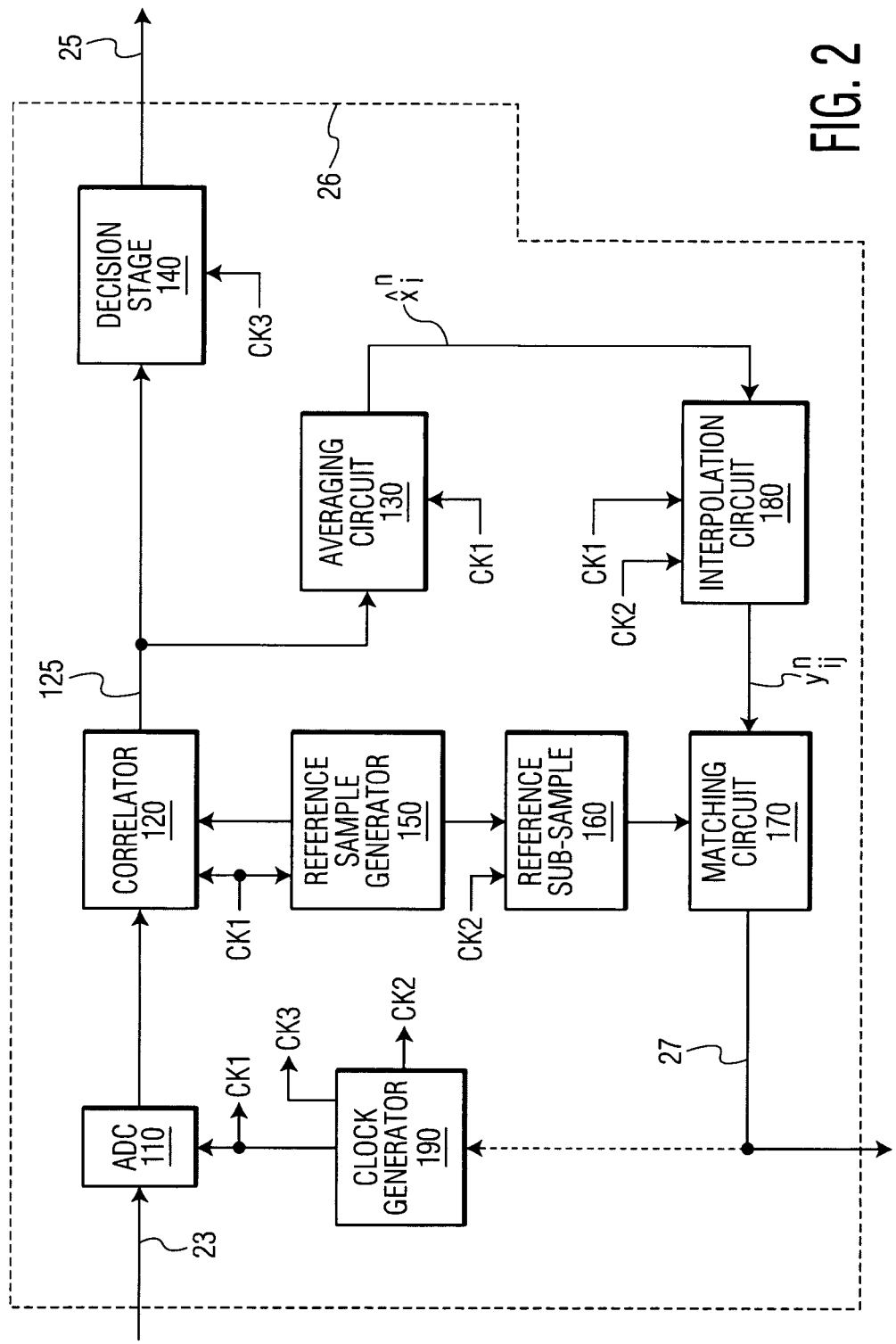
FIG. 2 is a block schematic diagram of a baseband processing section of a spread spectrum receiver.

Referring to FIG. 2 there is shown a block schematic diagram of the baseband processing section 26 of the receiver Rx. The signal delivered by the RF front end and demodulator 24 is coupled to a 1-bit analogue-to-digital converter (ADC) 110 which samples the received signal at a rate of N samples per chip, generating samples having a value of +1 or −1. For illustration, we use the example of N=10, in which case the ADC 110 delivers 22 Msample.s$^{-1}$. For the purpose of sampling, a sample rate clock CK1 is supplied to the ADC 110 by a clock generator 190.

The samples from the ADC 110 are delivered to a matched filter which is matched to the chip sequence. The matched filter comprises a correlator 120 which performs a correlation of the samples of the received signal with samples of a reference chip sequence supplied to the correlator 120 by a reference sample generator 150. For the purpose of generating the reference samples, the reference sample generator 150 is supplied with the sample rate clock CK1 from the clock generator 190.

The correlator 120 is clocked by the sample rate clock CK1 and delivers on an output 125 correlation values at the rate of the sample clock CK1.

Because of the autocorrelation properties of the P-N sequence, the correlation value peaks, in the absence of noise and distortion, at the instant when the samples of the reference chip sequence generated by the reference sample generator 150 are synchronised with the samples of the received signal, and, furthermore, the sign of the peak will correspond to the value of the transmitted bit. However in the presence of noise or distortion, spurious peaks in the correlator 120 output can result in erroneous bit decisions. Furthermore, the position of the peak at this point in the receiver Rx, without further processing according to the invention, has a resolution of ±0.5 sample interval.

The impact of noise and distortion is reduced by supplying the correlation values delivered by the correlator 120 on the output 125 to an averaging circuit 130. The averaging circuit 130 computes for each sample the weighted average of the absolute value of the correlation values occurring at intervals of the chip sequence length. The computation is summarised by the following equation:

$$\hat{\chi}_i^n = \alpha \cdot \hat{\chi}_i^{n-1} + (1-\alpha) \cdot \chi_i^n \text{ for i=1 to C.N}$$

where $\hat{\chi}_i^n$ is the ith weighted average value of the correlation value of the nth chip sequence, $\chi_i^n$ is the absolute value of the ith correlation value in the nth chip sequence, $\hat{\chi}_i^{n-1}$ is the ith weighted average value of the correlation value of the n−1th chip sequence, and α is the averaging gain and has a value in the range $0 \leq \alpha \leq 1$. Typically α=0.5 for a simple average and a higher value closer to 1 for a system more resistant to the effects of noise and distortion.

Figure 3:
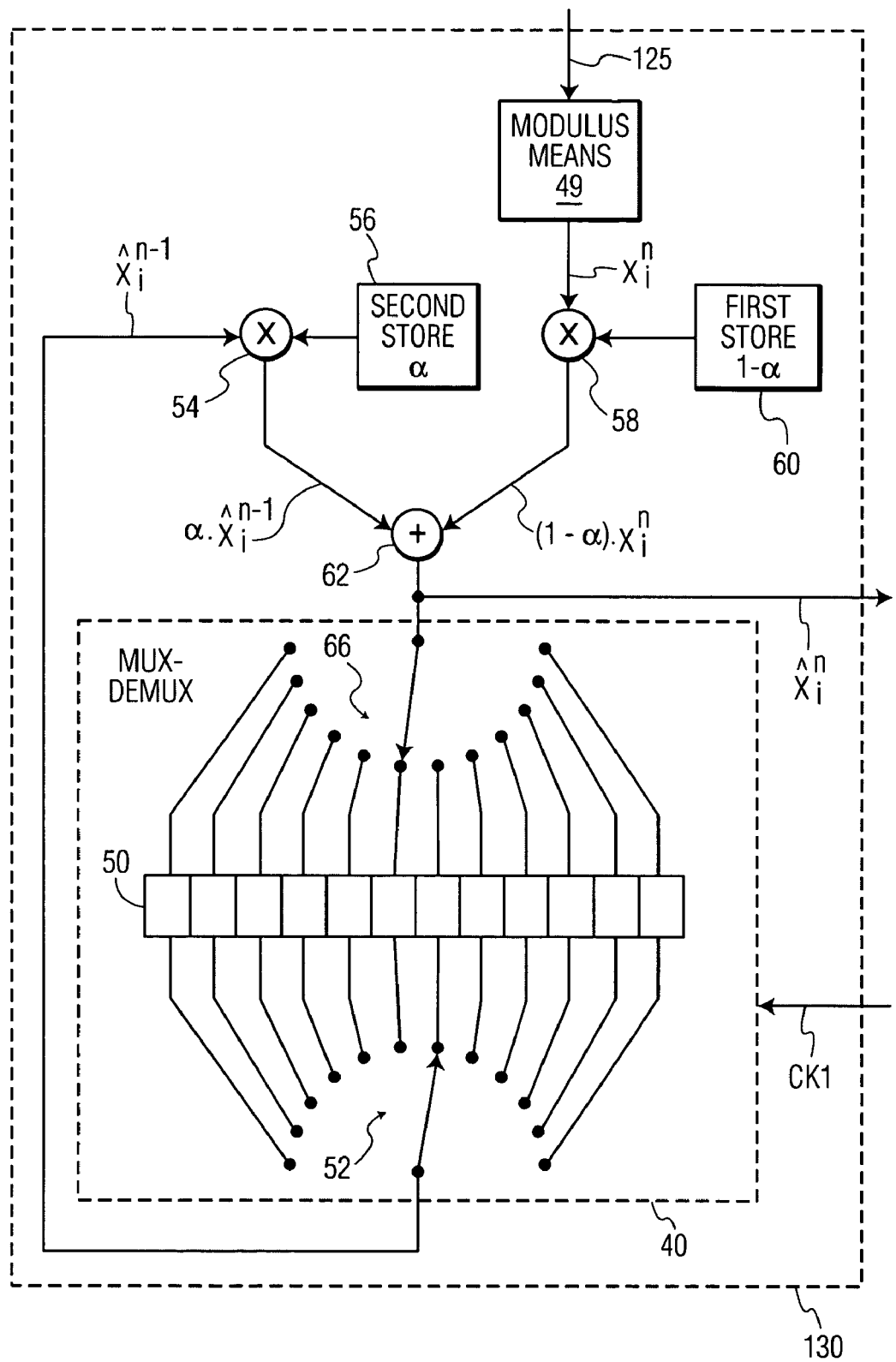
FIG. 3 is a block schematic diagram of an averaging circuit.

Referring to FIG. 3, there is illustrated an implementation of the averaging circuit 130. A modulus means 49 delivers $\chi_i^n$, the absolute value of each correlation value, to a first input of a first multiplier 58. A second input of the first multiplier 58 is supplied with a constant 1−α which is held in a first store 60, and the first multiplier 58 delivers the product $(1-\alpha) \cdot \chi_i^n$ to the first input of a first summing stage 62. A second input of the first summing stage 62 is supplied with the product $\alpha \cdot \hat{\chi}_i^{n-1}$ from a second multiplier 54 which is supplied at a first input with a constant α which is held in a second store 56 and with $\hat{\chi}_{n-1}$ at a second input. The generation of $\hat{\chi}_i^{n-1}$ is explained below. The first summing stage 62 delivers the sum $\alpha \cdot \hat{\chi}_i^{n-1} + (1-\alpha) \cdot \chi_i^n$, which is a weighted average correlation value.

For the generation of $\hat{\chi}_i^{n-1}$ there is multiplexer-demultiplexer 40 comprising a multistage store 50, a multiplexing arrangement 66 and a demultiplexing arrangement 52. The multistage store 50 is coupled to the output of the first summing stage 62 by means of the multiplexing arrangement 66. The multistage store 50 comprises C.N+1 stages (which in the present embodiment is 11.10+1=111 stages) for storing each of the C.N weighted average correlation values corresponding to the C.N samples comprising a chip sequence duration plus one value additional. Each value is entered into its respective stage of the multistage store 50 by the multiplexing arrangement 66. Each stage of the multistage store 50 is coupled to the demultiplexing arrangement 52 so that each stored value can be read-out in succession and applied to a second input of the second multiplier 54. The demultiplexing arrangement 52 is arranged to read out the corresponding ith weighted average correlation value of the previous chip sequence. The multiplexing and demultiplexing within the multiplexer-demultiplexer 40 is synchronised to the sample rate clock CK1.

Referring again to FIG. 2, observation of the output of the averaging circuit 130 would enable a peak in the correlation values output by the correlator 120 to be detected with a time resolution of ±0.5 sample interval. However, according to the invention, additional processing is provided to obtain a higher resolution, as follows. The weighted average correlation values $\hat{\chi}_i^n$, i=1 to C.N, computed by the averaging circuit 130 are supplied to an interpolation circuit 180.

The interpolation circuit 180 computes intermediate samples between consecutive values of the average weighted correlation values. Whereas the average weighted correlation values are computed by the averaging circuit 130 at intervals equal to the sample interval, the intermediate samples are computed at sub-sample intervals. For example, in the present embodiment M sub-samples (M=10) are generated for each sample interval, thereby resulting in N.M=10.10=100 sub-samples per chip. The sub-sample interval is $1/(2.2 \cdot 10^6 \cdot 100)=4.54 \cdot 10^{-9}$ s. The computation of sub-sample values is summarised by the following equation:

$$y_{ij}^n = \hat{x}_{i-1}^n + \frac{j}{M}[\hat{x}_i^n - \hat{x}_{i-1}^n] \text{ for } i = 1 \text{ to } C \cdot N \text{ and } j = 1 \text{ to } M$$

where $y_{ij}^n$ is the jth sub-sample of the ith average weighted correlation value of the nth chip sequence, $\hat{\chi}_i^n$ is the ith weighted average correlation value of the nth chip sequence, and $\hat{\chi}_{i-1}^n$ is the (i−1)th weighted average correlation value generated from the previous (i.e. i−1) sample.

Figure 4:
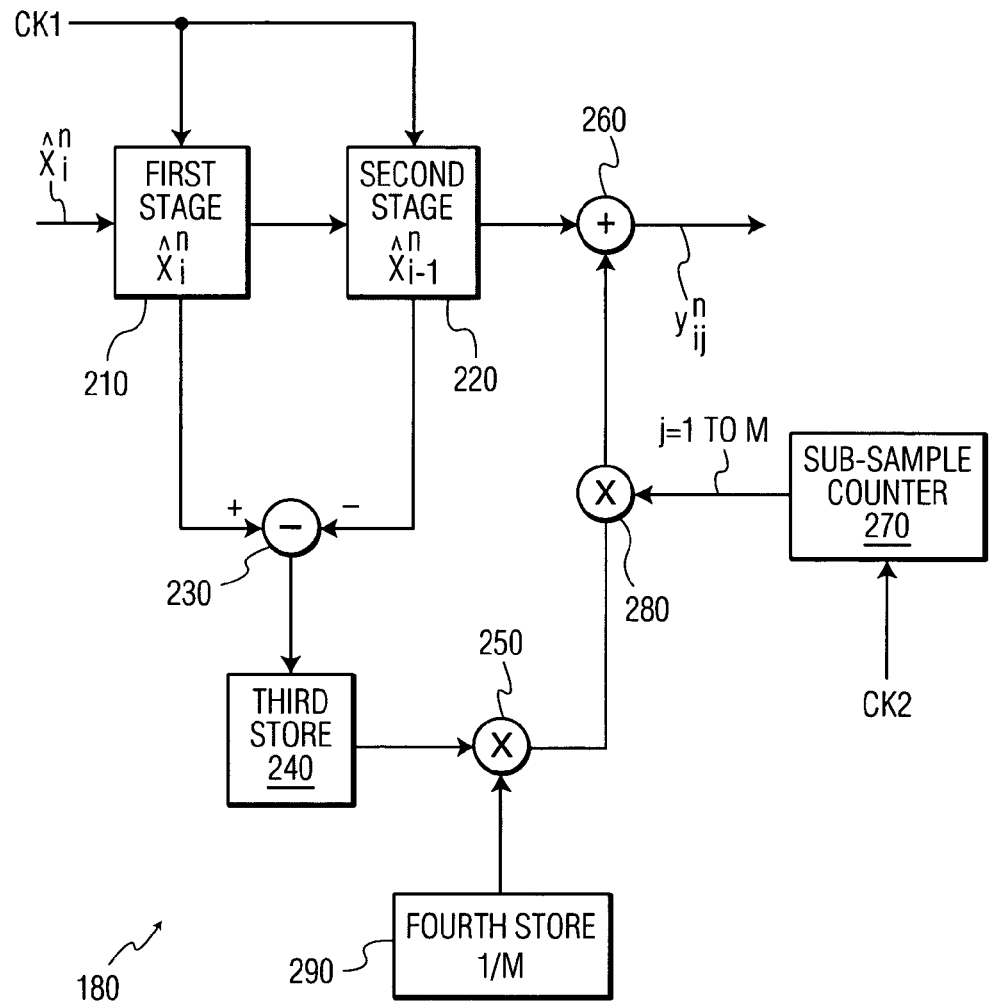
FIG. 4 is a block schematic diagram of an interpolation circuit.

Referring to FIG. 4, there is illustrated an embodiment of the interpolation circuit 180. There is a two stage shift register comprising a first stage 210 and a second stage 220. The first stage 210 stores the current weighted average correlation value $\hat{\chi}_i^n$ computed by the averaging circuit 130, and the second stage 220 stores the weighted average correlation value $\hat{\chi}_{i-1}^n$ computed for the previous sample by the averaging circuit 130. Clocking of the two stage shift register is synchronised to the sample rate clock CK1. The difference between the values stored in the shift register first and second stages 210, 220 is determined in a subtraction stage 230, and the resulting difference value $\hat{\chi}_i^n - \hat{\chi}_{i-1}^n$ is stored in a third store 240. A sub-sample increment is calculated in a third multiplier 250 which multiplies the difference value supplied by the third store 240 by a value 1/M held in a fourth store 290. Successive sub-sample increments are calculated in a fourth multiplier 280 which multiplies the sub-sample increment supplied by the third multiplier 250 by a count value j delivered by a sub-sample counter 270. The sub-sample counter counts from j=1 to M at a sub-sample rate controlled by a sub-sample clock CK2, which is generated by the clock generator 190. The sub-sample values $y_{ij}^n$, j=1 to M, are formed in a second summing stage 260 which adds the successive sub-sample increments to the value of the previous average weighted correlator value $\hat{\chi}_{i-1}^n$ held in the shift register second stage 220, and the sub-sample values are delivered on an output of the interpolation circuit 180.

Referring again to FIG. 2, the sub-sample values $y_{ij}^n$ are delivered to a matching circuit 170. The samples of the reference chip sequence generated by the reference sample generator 150 are supplied to a reference sub-sample generator 160 which generates sub-samples of the correlation function of the reference chip sequence at the same interval as the sub-sample values $y_{ij}^n$. The generation within the reference sub-sample generator 160 of the sub-samples of the correlation function of the reference chip sequence can be performed by a correlator and a circuit having the same structure as the interpolation circuit 180. Alternatively, the sub-samples of the correlation function of the reference chip sequence can be pre-calculated and held in a store. The sub-samples of the correlation function of the reference chip sequence are delivered to the matching circuit 170.

The matching circuit 170 determines the position of the chip sequence in the received signal by determining the position of closest match between the sub-samples $y_{ij}^n$ delivered by the interpolation circuit 180 and the sub-samples of the correlation function of the reference chip sequence delivered by the reference sub-sample generator 160. As an example, the position of closest match can be determined by using a correlator.

When the matching circuit has determined the position of the chip sequence in the received signal it generates an indication on the output 27. Processing of this position indication within the receiver Rx has been described above. In addition, the position indication may, optionally, be delivered to the clock generator 190 where it is used to synchronise the clock signals CK1, CK2 and CK3 (described below) to the received chip sequence.

The clock generator 190 generates a symbol clock CK3 at the symbol rate (which in the present embodiment is 200 kbit.$s^{-1}$). The symbol clock CK3 is supplied to a decision stage 140. The correlation values delivered by the correlator 120 are also delivered to the decision stage 140. The decision stage 140 stores the correlation value current at a time determined by the symbol clock CK3 and this value is delivered on the output 25 as the received bit soft decision value. Alternatively, the decision stage 140 stores the correlation value current at a time determined by the maximum value of $\hat{\chi}_i^n$ in each received chip sequence and this correlation value is delivered on the output 25 as the received bit soft decision value. Optionally, a hard decision value can be delivered by quantising the current correlation value.

Referring to the graphs of FIG. 5, the abscissae represent time in chip periods, and the full scale of 1000 chip periods corresponds to 1000/11=90.9 sequences each of 11 chips.

Trace A of FIG. 5 shows the correlation values obtained at the output of the sample correlator 120 under conditions of a 3 dB signal to noise ratio in the received signal and a sampling rate of N=10 samples per chip. Under noise free conditions peaks in the correlation values would occur once every sequence, whereas the peaks in trace A are distorted and partially obscured by the noise.

Trace B of FIG. 5 shows the weighted average correlation values obtained at the output of the averaging circuit 130 with an averaging gain α=0.975. It can be observed that the averaging process has smoothed the effect of noise thereby making the peaks in the weighted average correlation values distinct.

Trace C of FIG. 5 shows the position of the chip sequence in the received signal that would be indicated by the position of the peaks in the weighted average correlation values of trace B (i.e. without using the sub-sampling). It can be observed that, due to noise, the indicated chip sequence position varies by one sample interval (4.54 $10^{-8}$ s), varying between values of 11 and 12 samples. So a single position indication is accurate to only ±0.5 of a sample interval i.e ±2.27 $10^{-8}$ s. Greater accuracy can be obtained by averaging over position indications, at the expense of increased processing power and time delay, but the averaging period required to obtain a particular accuracy is dependent on the level of noise in the receiver, and the required averaging period increases for very low levels of noise and for very high levels of noise. With no noise in the receiver the chip position indication may be in error by ±0.5 of a sample interval because there is no noise causing a variation between different values which can be averaged. For example, if the true chip sequence position is at 11.6 samples, with no noise the indicated chip position would be quantised to a value of 12, thereby introducing an error of 0.4 of a sample interval.

Trace D of FIG. 5 shows the position of the chip sequence in the received signal that is indicated by the indication generated at the output 27 of the matching circuit 170 and which indicates the position of closest match between the sub-samples $y_{ij}^n$ delivered by the interpolation circuit 180 and the sub-samples of the correlation function of the reference chip sequence delivered by the reference sub-sample generator 160. It can be observed that by using sub-samples the resolution has been increased to a sub-sample interval, ±2.27 10$^{-9}$. Noise causes a variation in the indicated position of the chip sequence, but the averaging period required to obtain a particular accuracy is smaller than in trace C.

The sub-sample resolution obtained by using a receiver operating in accordance with the invention is equivalent to a resolution in distance measurement between the transmitter and receiver of ±0.681 m.

Optionally, the time of arrival supplied on the output 29 of the delay determining means may comprise an average derived from more than one occurrence of the chip sequence in the received signal of the time difference between the time reference signal and the indication of the position of the chip sequence in the received signal. By averaging in this way, greater resolution may be obtained. For example, by averaging over the 1000 chip periods depicted in trace D of FIG. 5, the average position of the chip sequence is 11.76 with a variance of 0.04 sample periods. The corresponding average if sub-samples had not been used, only samples, to determine the time difference between the time reference signal and the indication of the position of the chip sequence in the received signal would have been 11.92 with a variance of 0.07 samples.

Optionally, the sub-samples of the average weighted correlation values may be generated over a period shorter than the chip sequence length, being restricted to the vicinity of a peak in the average weighted correlation values.

Optionally, the sub-samples of the reference chip sequence generated by the reference sub-sample generator 160 may include distortion representative of distortion in the received signal caused by the propagation channel or distortion caused by the transmitter Tx or receiver Rx.

The invention claimed is:

1. A method of detecting a spread spectrum signal comprising a chip sequence, comprising the steps of: sampling at a sampling interval a received signal; filtering in a matched filter the samples thereby obtained; determining the absolute values of the filtered samples; deriving the weighted average values of the absolute values of the filtered samples occurring at intervals equal to the chip sequence length, the weighted average values being calculated over at least two such absolute values; interpolating successive weighted average values thereby generating sub-samples of the weighted average values at a sub-sampling interval shorter than the sampling interval; and determining the position of the chip sequence in the received signal by determining the position of closest match between the sub-samples and samples taken at the sub-sampling interval from a reference correlation function of the chip sequence.

2. A method as claimed in claim 1, wherein the position of closest match between the sub-samples and the samples of the reference correlation function of the chip sequence is determined by correlating the sub-samples with the samples of the reference correlation function of the chip sequence over a period of at least a portion of the chip sequence length.

3. A method as claimed in claim 1, wherein the weighted average values of the absolute values of the filtered samples are calculated in accordance with the equation:

$$\hat{X}_i^n = \alpha.\hat{X}_i^{n-1} + (1-\alpha).X_i^n$$

where $X_i^n$ is the absolute value of the i th filtered sample in the n th chip sequence, $\hat{X}_i^n$ is the weighted average value of the absolute value of the i th filtered sample in the n th chip sequence, $\hat{X}_i^{n-}$ is the weighted average value of the absolute value of the i th filtered sample in the n−1 th chip sequence, and α is the averaging gain and has a value in the range $0 \leq \alpha \leq 1$.

4. A method as claimed in claim 1, comprising determining the time of arrival of the spread spectrum signal as the determined position of the chip sequence in the received signal relative to a time reference.

5. A method as claimed in claim 1, comprising determining the time of arrival of the spread spectrum signal as the average of more than one determined position of the chip sequence in the received signal relative to a time reference.

6. A receiver for a spread spectrum signal comprising a chip sequence, comprising sampling means for sampling at a sampling interval a received signal, matched filtering means for filtering the samples thereby obtained, modulus means for determining the absolute values of the filtered samples, averaging means for calculating the weighted average values of the absolute values of the filtered samples occurring at intervals equal to the chip sequence length, the weighted average values being calculated over at least two such absolute values, interpolating means for interpolating successive weighted average values thereby generating sub-samples of the weighted average values at a sub-sampling interval shorter than the sampling interval, and matching means for determining the position of the chip sequence in the received signal by determining the position of closest match between the sub-samples and samples taken at the sub-sampling interval from a reference correlation function of the chip sequence.

7. A receiver as claimed in claim 6, wherein the matching means comprises correlating means for correlating the sub-samples with the samples of the reference correlation function of the chip sequence over a period of at least a portion of the chip sequence length.

8. A receiver as claimed in claim 6, wherein the weighted average values of the absolute values of the filtered samples are calculated in accordance with the equation:

$$\hat{X}_i^n = \alpha.\hat{X}_i^{n-1} + (1-\alpha).X_i^n$$

where $X_i^n$ is the absolute value of the i th filtered sample in the nth chip sequence, $\hat{X}_i^n$ is the weighted average value of the absolute value of the ith filtered sample in the nth chip sequence, $\hat{X}_i^{n-1}$ is the weighted average value of the absolute value of the ith filtered sample in the n−1 th chip sequence, and α is the averaging gain and has a value in the range $0 \leq \alpha \leq 1$.

9. A receiver as claimed in claim 6, comprising delay determining means for determining the time of arrival of the spread spectrum signal as the determined position of the chip sequence in the received signal relative to a time reference.

10. A receiver as claimed in claimed in claim 6, comprising delay determining means for determining the time of arrival of the spread spectrum signal as the average of more than one determined position of the chip sequence in the received signal relative to a time reference.

* * * * *